US011226793B2

(12) United States Patent
Baratta et al.

(10) Patent No.: US 11,226,793 B2
(45) Date of Patent: *Jan. 18, 2022

(54) WEB-BASED POINT OF SALE BUILDER

(71) Applicant: CLOUDOFCHANGE, LLC, Poughkeepsie, NY (US)

(72) Inventors: Wayne Baratta, Poughkeepsie, NY (US); Quentin Olson, Port Townsend, WA (US)

(73) Assignee: Cloudofchange, LLC, Poughkeepsie, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/827,948

(22) Filed: Nov. 30, 2017

(65) Prior Publication Data

US 2018/0088909 A1    Mar. 29, 2018

Related U.S. Application Data

(63) Continuation of application No. 15/635,097, filed on Jun. 27, 2017, now Pat. No. 10,083,012, which is a
(Continued)

(51) Int. Cl.
*G06Q 10/00*    (2012.01)
*G06F 8/30*     (2018.01)
(Continued)

(52) U.S. Cl.
CPC .................. *G06F 8/30* (2013.01); *G06F 8/34* (2013.01); *G06Q 20/20* (2013.01); *G06Q 20/202* (2013.01); *G06Q 30/06* (2013.01); *H04L 67/02* (2013.01)

(58) Field of Classification Search
CPC .............................. G06Q 20/20; G06Q 20/202
(Continued)

(56) References Cited

U.S. PATENT DOCUMENTS 5,818,428 A    10/1998   Eisenbrandt et al.
5,889,863 A     3/1999   Weber
(Continued)

FOREIGN PATENT DOCUMENTS

EP      1450324 A1    5/2017
GB      2369201       2/2002
(Continued)

OTHER PUBLICATIONS

Co-pending US Patent TY06-001, U.S. Appl. No. 11/710,722, filed Feb. 26, 2007, "Point of Sale System with Web-Based Back-Office," by Quentin Olson, 25 pgs.
(Continued)

*Primary Examiner* — Rokib Masud
(74) *Attorney, Agent, or Firm* — Knobbe, Marten, Olson & Bear, LLP

(57) ABSTRACT

This invention provides a system and a method for online, web-based point of sale (POS) building and configuration, which can assist non-expert business operators in building, editing and testing a point of sale system to manage their businesses. The business operations range from a single branch to a large chain of stores or branches. The key advantages of the Web-based POS builder are that it is completely built on the foundation of the Web. The POS builder is accessible anywhere in the world. It can be used by a person of any skill level. The POS builder builds, edits, and tests new POS terminals in real time.

44 Claims, 5 Drawing Sheets

Related U.S. Application Data continuation of application No. 15/198,117, filed on Jun. 30, 2016, now Pat. No. 9,715,371, which is a continuation of application No. 12/012,666, filed on Feb. 5, 2008, now Pat. No. 9,400,640.

(51) Int. Cl.
| | | |
|---|---|---|
| *G06Q 30/06* | (2012.01) | |
| *G06F 8/34* | (2018.01) | |
| *G06Q 20/20* | (2012.01) | |
| *H04L 29/08* | (2006.01) | |

(58) Field of Classification Search
USPC .................................................. 705/16, 34
See application file for complete search history.

(56) References Cited

U.S. PATENT DOCUMENTS

| | | | |
|---|---|---|---|
| 5,920,312 | A | 7/1999 | Wagner |
| 5,956,716 | A | 9/1999 | Kenner et al. |
| 5,987,426 | A | 11/1999 | Goodwin, III |
| 6,002,395 | A * | 12/1999 | Wagner ............... G06F 9/451 715/763 |
| 6,304,886 | B1 | 10/2001 | Bernardo et al. |
| 6,384,850 | B1 * | 5/2002 | McNally ............ G06F 16/9577 715/810 |
| 6,629,080 | B1 | 9/2003 | Kolis |
| 6,993,498 | B1 | 1/2006 | Deaton et al. |
| 7,015,945 | B1 * | 3/2006 | Sullivan ........... G08B 13/19671 348/150 |
| 7,051,091 | B1 | 5/2006 | Cohen et al. |
| 7,086,584 | B2 | 8/2006 | Stoutenburg et al. |
| 9,317,844 | B2 | 4/2016 | Richelson et al. |
| 2001/0037245 | A1 | 11/2001 | Ranganath |
| 2002/0194074 | A1 * | 12/2002 | Jacobs ................. G07G 1/145 705/16 |
| 2003/0041330 | A1 | 2/2003 | Smith |
| 2003/0078849 | A1 | 4/2003 | Snyder |
| 2003/0120546 | A1 | 6/2003 | Cusack et al. |
| 2003/0236755 | A1 | 12/2003 | Dagelet |
| 2004/0128199 | A1 * | 7/2004 | Cusack ................ G06Q 20/20 705/16 |
| 2004/0143512 | A1 | 7/2004 | Sturr |
| 2004/0181454 | A1 * | 9/2004 | Manno ............... G06Q 20/202 705/21 |
| 2005/0021409 | A1 * | 1/2005 | Michaud, Jr. ............ G07G 1/14 705/16 |
| 2005/0049921 | A1 * | 3/2005 | Tengler .............. G06Q 10/087 705/15 |
| 2005/0182680 | A1 | 8/2005 | Jones et al. |
| 2006/0026502 | A1 | 2/2006 | Dutta |
| 2006/0235755 | A1 * | 10/2006 | Mueller ............... G06Q 30/06 705/15 |
| 2007/0005685 | A1 | 1/2007 | Chau et al. |
| 2007/0175992 | A1 | 8/2007 | Brown |
| 2007/0265935 | A1 * | 11/2007 | Woycik ................. G07F 9/002 705/65 |
| 2007/0276763 | A1 | 11/2007 | Kleinman et al. |
| 2008/0077872 | A1 * | 3/2008 | Zeevi ...................... G06F 8/38 715/762 |
| 2008/0208698 | A1 | 8/2008 | Olson et al. |
| 2009/0182630 | A1 | 7/2009 | Otto et al. |
| 2011/0218872 | A1 | 9/2011 | Richelson et al. |
| 2016/0253645 | A1 | 9/2016 | Ciabarra et al. |
| 2017/0300301 | A1 | 10/2017 | Baratta et al. |

FOREIGN PATENT DOCUMENTS

| | | |
|---|---|---|
| WO | WO2001018629 | 3/2001 |
| WO | WO2001065427 | 9/2001 |
| WO | WO2003065178 | 8/2003 |
| WO | WO2005115074 | 12/2005 |

OTHER PUBLICATIONS

Co-pending US Patent TY06-002, U.S. Appl. No. 11/710,723, filed Feb. 26, 2007, "Point of sale Video Server Processing System," by Quentin Olson et al., 24 pgs.
Co-pending US Patent TY06-003, U.S. Appl. No. 12/012,393, filed Feb. 1, 2008, "Hand-Held Web Browser Inventory Checking System," by Quentin Olson et al., 24 pgs.
Localsoft Tech, db2k e-Store Builder 3.00 details, 3 pgs, found Feb. 8, 2008, http://www.soft32donwload.com/software/dbk-e-STore-Builder-download-details.html.
IBM 4690 ASTRA—Graphical User Interface (GUI)—Specifications, 1 pg., found Feb. 8, 2008, http://www.03.ibm.com/products/retail/products/software/gui/astra/specs.html.
Defendant's Invalidity Contentions in Case No. 6:19-CV-00513-ADA, *CloudofChange, LLC,* v. *NCR Corporation,* dated Feb. 24, 2020 in 27 pages.
Exhibit A1: Invalidity of U.S. Pat. No. 9,400,640 based on US2007265935 ("Woycik") in 10 pages.
Exhibit A2: Invalidity of U.S. Pat. No. 10,083,012 based on US2007265935 ("Woycik") in 10 pages.
Exhibit A3: Invalidity of U.S. Pat. No. 9,400,640 based on US20070175992 ("Brown") in 9 pages.
Exhibit A4: Invalidity of U.S. Pat. No. 10,083,012 based on US20070175992 ("Brown") in 11 pages.
Exhibit A5: Invalidity of U.S. Pat. No. 9,400,640 based on U.S. Pat. No. 5,920,312 ("Wagner") in 6 pages.
Exhibit A6: Invalidity of U.S. Pat. No. 10,083,012 based on U.S. Pat. No. 5,920,312 ("Wagner") in 7 pages.
Exhibit A7: Invalidity of U.S. Pat. No. 9,400,640 based on US20020194074 ("Jacobs") in 6 pages.
Exhibit A8: Invalidity of U.S. Pat. No. 10,083,012 based on US20020194074 ("Jacobs") in 6 pages.
Exhibit A9: Invalidity of U.S. Pat. No. 9,400,640 based on US20060235755 ("Mueller") in 8 pages.
Exhibit A10: Invalidity of U.S. Pat. No. 10,083,012 based on US20060235755 ("Mueller") in 8 pages.
Exhibit A11: Invalidity of U.S. Pat. No. 9,400,640 based on US20050049921 ("Tengler") in 9 pages.
Exhibit A12: Invalidity of U.S. Pat. No. 10,083,012 based on US20050049921 ("Tengler") in 9 pages.
Exhibit B1: Invalidity of U.S. Pat. No. 9,400,640 based on US20050021409 ("Michaud") in 6 pages.
Exhibit B2: Invalidity of U.S. Pat. No. 10,083,012 based on US20050021409 ("Michaud") in 6 pages.
Exhibit B3: Invalidity of U.S. Pat. No. 9,400,640 based on US20040143512 ("Sturr") in 6 pages.
Exhibit B4: Invalidity of U.S. Pat. No. 10,083,012 based on US20040143512 ("Sturr") in 6 pages.
Exhibit B5: Invalidity of U.S. Pat. No. 9,400,640 based on EP1450324 ("Yamada") in 6 pages.
Exhibit B6: Invalidity of U.S. Pat. No. 10,083,012 based on EP1450324 ("Yamada") in 7 pages.
Exhibit B7: Invalidity of U.S. Pat. No. 9,400,640 based on U.S. Pat. No. 6,384,850 ("McNally") in 7 pages.
Exhibit B9: Invalidity Claims of U.S. Pat. No. 9,400,640 based on ACS Back Office Options, R6.0 in 9 pages.
Exhibit B9: Invalidity of U.S. Pat. No. 10,083,012 based on U.S. Pat. No. 6,384,850 ("McNally") in 7 pages.
Exhibit B10: Invalidity of U.S. Pat. No. 10,083,012 based on ACS Back Office Options, R6.0 in 10 pages.
Exhibit C1: Invalidity of U.S. Pat. No. 9,400,640 under 35 U.S.C. §112 in 4 pages.
Exhibit C2: Invalidity of U.S. Pat. No. 10,083,012 under 35 U.S.C. §112 in 3 pages.
Exhibit D1: Claims 1-14 of the '640 Patent Are Invalid Under 35 U.S.C. §101 in 2 pages.
Exhibit D2: Claims 1-13 of the '012 Patent Are Invalid Under 35 U.S.C. §101 in 3 pages.
DynaKey 5952, DynaKey Real POS 5952 Wedge User's Guide, R1.0, NCR, 1999.

(56) References Cited

OTHER PUBLICATIONS

DynaKey 5953, NCR Real POS™ 5953 USB DynaKey™ User's Guide, Release 2.3, NCR, 2002.
DynaKey 5954. DynaKey Real POS 5954 Next Generation R1.2, NCR, 2006.
DynaKey 80c, NCR Real POS™ 80c Hardware User's Guide, Release 1.1, NCR, 2002.
ACS Trng 6.0, Advanced Checkout Solution Operator, Training Guide, R6.0, NCR, 2003.
ACS 6.0, Advanced Checkout Solution BackOffice Options, R6.0, NCR, 2000.
ACS 6.2, Advanced Checkout Solution BackOffice Options, R6.2, NCR, 2008.
ACS Brochure, NCR Advanced Checkout Solution, NCR, 2003.
ACS Buehler, NCR ACS Buehler's Success Story, NCR, 2004.
ACS Heinen, NCR ACS Heinen's Success Story, NCR, 2004.
ACS Lund, NCR ACS Lund's Success Story, NCR, 2005.
UPOS, NCR Retail Controls 3.x UPOS Users Guide, Issue H, NCR, 2007.
RSM Win, NCR Retail Platform Software for Windows, Release 4.0, NCR, 2009.
Van der Vlugt, Michel, and Sambasivam, Samuel. "Redesign of Stand-Alone Applications into Thin-Client/Server Architecture". Retrieved from: http://proceedings.informingscience.org/InSITE2005/I57f13Vulg.pdf. (2005).
*CloudofChange, LLC* v. *NCR Corporation*, Defendant's First Amended Invalidity Contentions, Aug. 19, 2020.
*CloudofChange, LLC* v. *NCR Corporation*, Defendant's Final Invalidity Contentions, Aug. 31, 2020.
Exhibit A1: Invalidity of U.S. Pat. No. 9,400,640 based on US2007265935 ("Woycik")(First Supplement).
Exhibit A2: Invalidity of U.S. Pat. No. 10,083,012 based on US2007265935 ("Woycik")(First Supplement).
Exhibit A3: Invalidity of U.S. Pat. No. 9,400,640 based on US20070175992 ("Brown")(First Supplement).
Exhibit A3: Invalidity of U.S. Pat. No. 9,400,640 based on US20070175992 ("Brown")(Second Supplement).
Exhibit A4: Invalidity of U.S. Pat. No. 10,083,012 based on US20070175992 ("Brown")(First Supplement).
Exhibit A4: Invalidity of U.S. Pat. No. 10,083,012 based on US20070175992 ("Brown")(Second Supplement).
Exhibit A5: Invalidity of U.S. Pat. No. 9,400,640 based on U.S. Pat. No. 5,920,312 ("Wagner")(First Supplement).
Appendix A6: Invalidity of U.S. Pat. No. 10,083,012 based on U.S. Pat. No. 5,920,312 ("Wagner")(First Supplement).
Exhibit A7: Invalidity of U.S. Pat. No. 9,400,640 based on US20020194074 ("Jacobs")(First Supplement).
Exhibit A8: Invalidity of U.S. Pat. No. 10,083,012 based on US20020194074 ("Jacobs")(First Supplement).
Exhibit A9: Invalidity of U.S. Pat. No. 9,400,640 based on US20060235755 ("Mueller")(First Supplement).
Exhibit A10: Invalidity of U.S. Pat. No. 10,083,012 based on US20060235755 ("Mueller")(First Supplement).
Exhibit A11: Invalidity of U.S. Pat. No. 9,400,640 based on US20050049921 ("Tengler")(First Supplement).
Exhibit A12: Invalidity of U.S. Pat. No. 10,083,012 based on US20050049921 ("Tengler")(First Supplement).
Exhibit A13: Invalidity of U.S. Pat. No. 9,400,640 based on the Cybertill System (First Supplement).
Exhibit A13: Invalidity of U.S. Pat. No. 9,400,640 based on the Cybertill System.
Exhibit A14: Invalidity of U.S. Pat. No. 10,083,012 based on the Cybertill System (First Supplement).
Exhibit A14: Invalidity of U.S. Pat. No. 10,083,012 based on the Cybertill System.
Exhibit B7: Invalidity of U.S. Pat. No. 9,400,640 based on U.S. Pat. No. 6,384,850 ("McNally")(First Supplement).
Exhibit B8: Invalidity of U.S. Pat. No. 10,083,012 based on U.S. Pat. No. 6,384,850 ("McNally")(First Supplement).
MICROS Simphony™, http://www.micros.com:80/Products/Simphony/, dated 2006, in 1 page.
MICROS mymicros.net, http://www.micros.com:80/Products/Simphony/, dated 2006, in 1 page.
MICROS Restaurants, http://www.micros.com:80/Products/Simphony/, dated 2006, in 2 pages.
MICROS Delivers Harmony to POS Technology with Simphony(TM). The Industry's First True Enterprise POS Solution, Featuring Service Oriented Architecture, Debuts at FS/TEC, Oct. 10, 2007, 3 pp.

\* cited by examiner

| Qty | Description | Amount | | | | | |
|---|---|---|---|---|---|---|---|
| | | | PRETZELS 11 | DRINKS 12 | | | |
| | | | Caramel Crunch Pretzel | Cinnamon Sugar Pretzel | Garlic | Original Pretzel | Parmesan Pretzel |
| | | 13 | | | | | |
| | | | Pretzel Dog | Sour Cream & Onion Pretzel | Pretzel Sticks | Caramel | Cheddar Cheese |
| | | 13 | | | | | |
| | Total | | Honey Mustard | Nacho Cheese | Pizza Sauce | | |
| UP | DOWN | 14 | | | | | |
| 7 | 8 | 9 | QTY | SOLD ITEM | COIN SALE | OPEN DRAWER | |
| 4 | 5 | 6 | ENTER | CASH | RETURN LAST RECEIPT | MISC | |
| 1 | 2 | 3 | | | | | |
| CLEAR | 0 | 00 | | FUNCTION | $5 | $10 | $20 | $50 |

*FIG. 1*

| Qty | Description | Amount | | | | | |
|---|---|---|---|---|---|---|---|
| | garlic | 2.29 | HOME | DRINKS | SMALL | MEDIUM | LARGE |
| | pizza sauce | 0.59 | | | | | |
| | cranberry grape | 1.49 | | | | | |
| | large sprite | 1.50 | COKE | DIETCOKE | PUNCH | | SPRITE |
| | | | | | | | |
| | | | | | | | |
| | | | APPLE JUICE | CRANBERRY APPLE RASPBERRY | CRANBERRY GRAPE | DANNON SPRING WATER | MINUTE MAID ORANGE JUICE |
| | | | | | | | |
| | | | COLUMBIAN | | VANILLA | NUT | MACADAMIA NUT |
| | Total | | | | | | |
| UP | | DOWN | | | | | |
| 7 | 8 | 9 | QTY | | | | |
| 4 | 5 | 6 | ENTER | CASH | RETURN LAST RECEIPT | MISC | |
| 1 | 2 | 3 | | | | | |
| CLEAR | 0 | 00 | | FUNCTION | $5 | $10 | $20 | $50 |

FIG. 2

|  |  |  |  |
|---|---|---|---|
| Screen 1 | Screen 2 SUBS | Screen 3 | Screen 4 |
| Add Item 20 | Add Item | Add Item | Add Item |
|  |  |  |  |
|  |  |  |  |

21 (pointing to Screen 1 area)

FIG. 4a

Screen 1

|  |  |  |  |
|---|---|---|---|
| PIZZA |  |  |  |
| LARGE PIZZA | | | |
|  |  |  |  |
|  |  |  |  |

22 — LARGE PIZZA

ITEM NAME _____
PRICE _____
COST _____
GROUP _____
TAXABLE _____
INVENTORY _____
} 23

FIG. 4b

WEB-BASED POINT OF SALE BUILDER

This is a continuation of U.S. patent application Ser. No. 15/635,097, filed Jun. 27, 2017, which is a continuation of U.S. patent application Ser. No. 15/198,117, filed Jun. 30, 2016, which is a continuation of U.S. patent application Ser. No. 12/012,666, filed on Feb. 5, 2008, each of which are herein incorporated by reference in their entirety.

RELATED PATENT APPLICATIONS

This application is related to U.S. application Ser. No. 11/710,722, filed on Feb. 26, 2007, and U.S. application Ser. No. 11/710,723, filed on Feb. 26, 2007, which are herein incorporated by reference in its entirety.

BACKGROUND OF THE INVENTION

Field of the Invention

This invention relates to a system and a method for building a point of sale (POS) system to manage business operations. The business operations range from a single branch to a large chain of stores or branches.

More particularly this invention relates to an online, web-based point of sale builder method, which can assist non-expert business operators in assembling a point of sale system to manage their businesses.

Description of Related Art

Current practice in the field of assembling point of sale systems includes manually coding front-of-screen information. Typically, this front-of-screen information contains menu selections, page selections, and general answers to business questions. This front-of-screen menu is typically manually coded by a business expert with the help of a programmer or data expert. Also, currently the entry of this front-of-screen information requires intimate knowledge of a complex interface to a front-of-screen programming language. In summary, current practice includes the manual building of a point of sale (POS) screen. This manual process requires defining the position and operation of touch screen keys and their database correspondence. Currently, only specially trained people can build or change POS screens. This manual POS building and editing is prone to mistakes and is time-consuming. Since POS screen changes are difficult and prone to error, store owners tend to retain older, inaccurate, out-of-date POS screens in order to avoid the POS screen editing process. Also, current POS screen editing occurs off-line with the testing of the screens occurring at a later date, at a remote store location. The following references represent prior art in the field of screen configuration building.

U.S. Pat. No. 5,818,428 (Eisenbrandt et al.) describes a control system with a user configurable interface, particularly suitable for use in connection with appliances. Users can configure display screens either at a point of sale location or at home with a personal computer.

U.S. Pat. No. 6,629,080 B1 (Kolls) describes a universal advertising and payment system and method for networking, monitoring and advancing electronic commerce and controlling vending equipment.

U.S. Pat. No. 7,051,091 B1 (Cohen et al.) discloses a configuration builder useful in configuring software containing hardware units which are serviced by a center which services a multiplicity of similar units having a plurality of different configurations.

U.S. Pat. No. 5,987,426 (Goodwin) describes a system and method of transferring information between a first software application and a second software application which employ an isolation layer. The system includes a client computer system provided by a first seller of computer systems, including a client software application, and a server computer system provided by a second seller of computer system.

BRIEF SUMMARY OF THE INVENTION

It is the objective of this invention to provide a system and a method for building a point of sale (POS) system to manage business operations. The business operations range from a single branch to a large chain of stores or branches.

It is further an object of this invention to provide an online, web-based point of sale builder system and method, which can assist non-expert or expert business operators in assembling a point of sale system to manage their businesses. This point of sale building operation can be done in real time from anywhere in the world.

The objects of this invention are achieved by a web-based point of sale (POS) builder comprising one or more point of sale terminals, which display POS, screens, an Internet connection to a web server, one or more local or remote PC workstations, and point of sale builder software which runs on said web server. Local or remote workstations can be utilized to build or edit said POS terminals in real time, from anywhere in the world and over the world-wide web.

BRIEF DESCRIPTION OF THE DRAWINGS

FIG. 1 shows a typical point of sale touch screen for a pretzel store, as an example only.

FIG. 2 shows a typical touch screen for the drinks panel of a pizza restaurant, as an example only.

FIG. 4a is a sample screen builder panel before the screen building process begins.

FIG. 4b is a sample screen builder panel after the screen building process is under way.

DETAILED DESCRIPTION OF THE INVENTION

Figure 3:
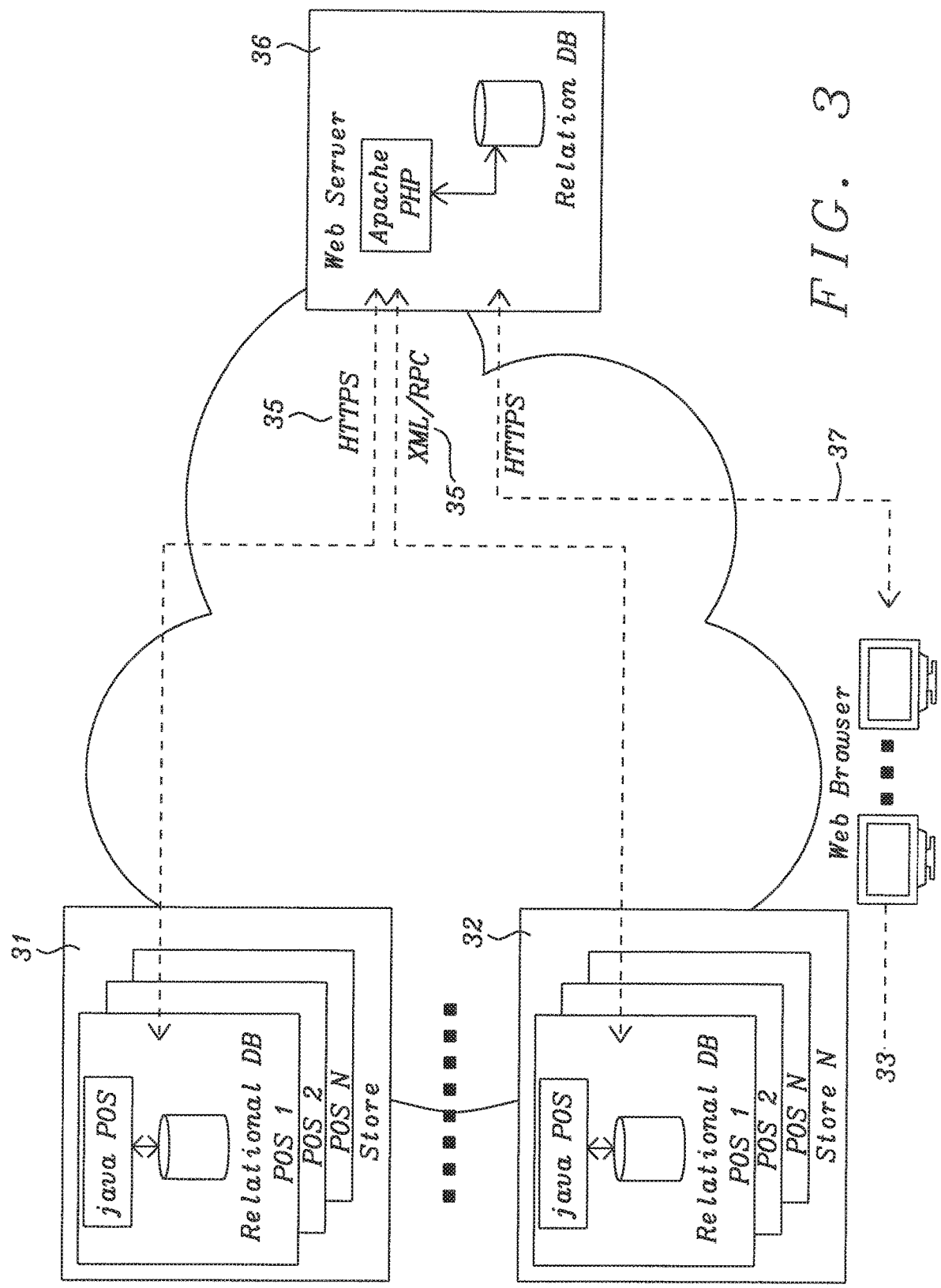
FIG. 3 is a system diagram for web-based back office which supports point of sale terminals.

FIG. 1 shows a typical point of sale (POS) touch screen for, as an example only, a pretzel store. There are touch keys for pretzels 11 and for drinks 12. Selecting these keys would typically bring up secondary screens displaying specific product keys for ordering different types of pretzels and drinks respectively. In addition, the screen in FIG. 1 has some specific pretzel product keys 13 and specific pretzel topping keys 14. Currently in the prior art, a touch screen as shown in FIG. 1 is manually configured by a programmer who knows the specific proprietary point of sale system used by a store or business. The FIG. 1 screen design involves the specific key layout and size of keys. In addition, the FIG. 1 screen keys must have corresponding hooks or references to product data such as item name, price, cost, group, taxable, and inventory as shown in FIG. 4. In this invention, this product data and the touch key structure is stored in relational databases in the back office which is stored on the web servers 36 shown in FIG. 3.

As an example only, FIG. 2 shows a touch screen for the drinks page of a pizza restaurant. Again in the prior art, a specialized programmer had to design the layout and data for these POS touch keys. Typically, the programmer is located remotely from the store or business. He or she must learn about the store's POS requirements via phone calls, emails, and meetings with store operators. In addition, the programmer would need to iterate several passes of the touch screen design and allow the store operator to test the screens. With this invention, the store operator will be able to build his POS screens online over the Internet. With input from the store operator, the POS builder can specify and display the number, shape and arrangement of selection keys or buttons on said POS screens. The store operator, who does not have to be technically trained, will be able to edit and test his screens until he is satisfied with the end results. The testing of said POS screens can be done iteratively by the store operator in real time while said POS terminals are simultaneously in use during store and business operation hours or after store hours. Alternatively, the testing of said POS screens can be done iteratively by a remotely located person such as a store manager or director in real time while said POS terminals are simultaneously in use during store hours or after store hours. All backoffice changes which include screen changes, price changes, employee validation changes are submitted to a batch bucket or queue. These changes have to be submitted for final posting at a scheduled time. For example, the phasing in of new screens and/or new data such as prices and employee validation can be scheduled. The time schedule for uploading or posting these screen changes and/or new data can be specified as follows. Only as examples, the changes can take place after the present transactions are completed. Alternatively, the changes can take place at the end of the business day, during the night, at the start of the next day or at the next application restart for example. Typically, screen changes will take place at the next application start at the beginning of a business day.

This automatic online POS builder will reduce the development time for POS screens by weeks. In addition, the store operator will be able to edit the POS screens and its relational databases any time as often as desired. In addition, the store operator will be able to edit, change and test the screens within minutes in real time. The store operator can iterate these changes instantly until he gets the desired screen appearance. This real-time testing and iteration of screen designs is an important feature of this invention. This feature motivates the store operator to keep his screens up to date and accurate. Previously, the store operator would avoid updating screens, since it involved the time and expense of working with programmers off line.

FIG. 3 shows a high level diagram of this invention. There are N POS terminals (POS 1, POS 2 . . . POS N) in "Store" 31 and in "Store N" 32. POS 31 is in Store 1 and POS 2 (32) is in Store 2. Each POS includes personal computer hardware and software. Additional POS terminals beyond those shown, as well as additional stores beyond the two shown, are within the scope of the invention. Each POS normally operates with a hardware/software connection 35 to the Internet or Web. However, if the web goes down, the POS terminal continues to operate. There is a "loose coupling" of the POS to the back office (BO): the POS to BO connection is not required for the basic business functions of the POS. All transaction data is stored in a relational database on the hard drive in the POS.

A relational database stores all of its data inside tables. All operations on data are done on the tables themselves. Some operation produce other tables as the result. A table is a set of rows and columns. Each row is a set of columns with only one value for each. All rows from the same table have the same set of columns, although some columns may have NULL values. A NULL value is an "unknown" value. The rows from a relational table are analogous to a record, and the columns are analogous to a field. Below is an example of a relational table.

| NAME | COMPANY | E_MAIL |
|---|---|---|
| Jane A. Doe | ABC | jad@abc.com |
| Bill X. Smith | XYZ | bxs@xyz.com |

There are two basic operations one can perform on a relational table. The first one is retrieving a subset of its columns. The second is retrieving a subset of its rows. The field names such as company describe the content of the columns of the relational table. The rows delineate the individual records stored in the relational tables.

As transactions are created at a POS a log entry for the newest transaction is also created, this log entry is used to flag if the transaction has been uploaded to the web server. Part of the POS application, the BO interface is continuously running in the background. This component reads the log of transactions. If a transaction needs to be sent, it tries to send it. If the send fails (for example, if the connection to, or the Internet itself, is down), it goes to sleep and tries again later. Additionally, the BO interface requests update from the BO such as new items, price changes, employees, etc. The POS terminals communicate via HTTP protocol (hypertext transfer protocol) 35 with Back-office BO software, which is implemented on web servers 36, which can be located anywhere in the world. In addition, the BO software and data can be viewed from any store employee at any PC 33 who has Internet access 37 and a password.

The POS such as 31 send transaction data to the BO in the form of an HTTP post or communication. The packet 35 sent from the POS to the BO consists of transactions, employee clock, customer add/update, item add/update, promotions and more. Promotions are configured in the back office and associated with items or customers or departments. For example, a promotion may be associated with a customer to implement customer loyalty points or a promotion may be associated with a certain item for a % discount. A client who is the store manager or owner selects a promotion type, associates it with an item, department, etc, then sets the parameters that control how that promotion works. These transaction transmissions between the POS and the BO can be encrypted to insure privacy and security. A typical encryption method is 128 bit SSL (secure sockets layer). A further element of security is that each BO client (individual POS, store or multi-store owner) gets their own instance of a database. When they log into the BO they are attached to their own relational database associated and validated via their user login and password.

FIGS. 4a and 4b show a typical web-based POS builder interface. FIG. 4a shows a grid of boxes labeled with screen numbers 1-4. Typically, screens will have screen names such as in 21, "Subs". Under each screen box column are boxes labeled "Add Item". These boxes allow the addition of different products such as small pizza, large pizza, etc. as shown in FIG. 4b. FIG. 4b shows the data interface which would appear when selecting the large pizza box. The store operator would be able to enter and/or modify item name, price, cost, group, taxable and inventory. The above illustrates the ease of building POS screens by store operators via the Web.

Figure 5:
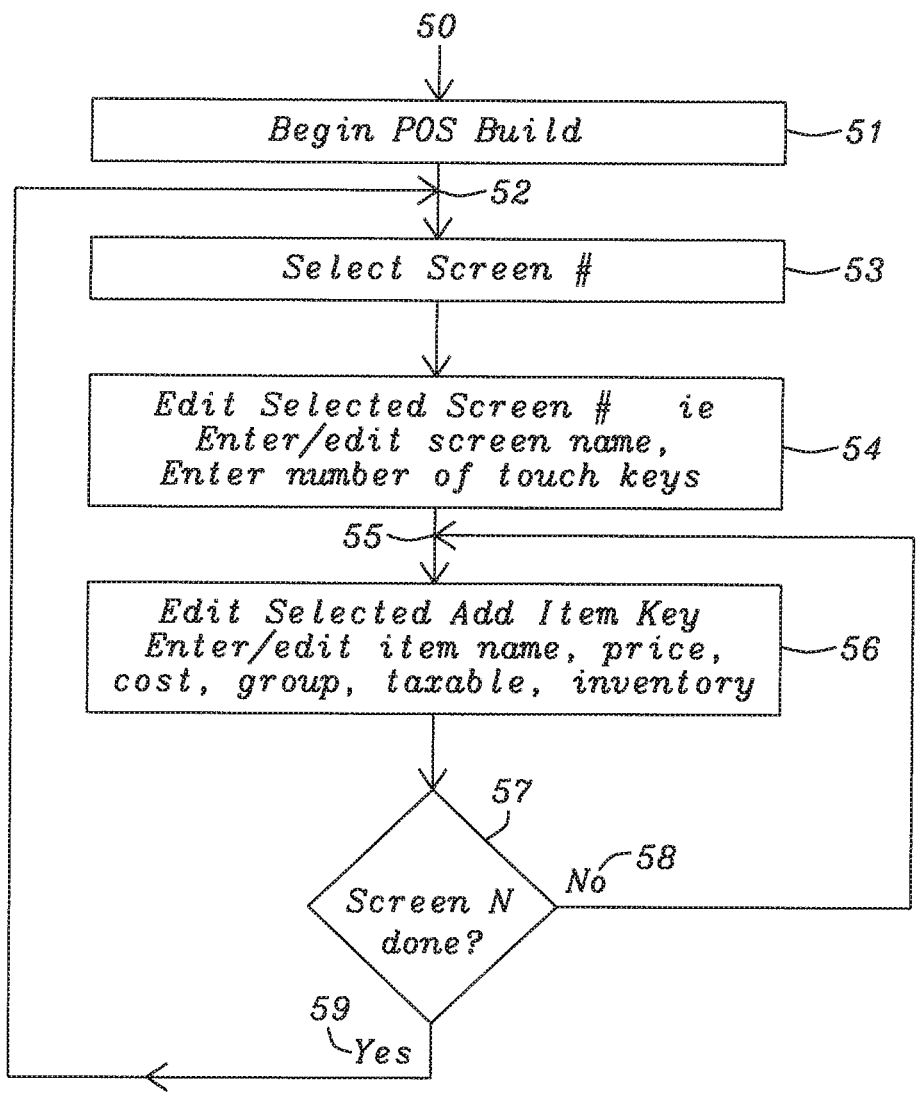
FIG. 5 is a high level flowchart which illustrates the main embodiment of the screen building process.

FIG. 5 shows a flowchart of the point of sale builder methodology. The flow in FIG. 5 also refers to FIGS. 4a and 4b. The Begin POS Build block 51 is entered when the Builder Program is initiated 50 from a Web page action.

When creating a new POS, Block 51 brings up a screen such as that shown in FIG. 4a. The screens in FIG. 4a need to be defined. Block 53 allows the store operator to select which screen number to define. FIG. 4b shows what appears on the Web screen after the store operator selects screen #1 (53) to work on. In FIG. 5, Block 54 allows the store operator to enter/edit the screen name being worked on, such as pizza, as an example only, in FIG. 4b. In FIG. 5, block 54 allows the store operator to enter the number of touch keys planned for the pizza screen, as an example only.

FIG. 4b shows the screen after a few touch screen buttons have been defined. Screen 1 has been labeled Pizza. The pizza screen in FIG. 4b currently has 1 touch screen button item defined on the screen, Large pizza 22. The Large Pizza item button was entered by hitting ADD Item 20 in FIG. 4a. After hitting add item, FIG. 4b appears with the template 23 to be filled in. This step is shown in block 56 of FIG. 5. The template includes Item Name, Price, Cost, Group. Taxable, Inventory. Item Name is Large Pizza. Price is easily changeable, Cost is the cost of making materials. Group is the Pizza Group, Taxable is as yes or no selection. Inventory can be used to monitor the number of Large Pizza's makeable with the dough, cheese and sauce on hand. Other Template items can be added to the template 23 in FIG. 4b.

In FIG. 5, block 57 asks whether the screen being worked on i.e.) Pizza Screen is done. If the store operator answers yes 59, the flowchart flows to Node 52 in FIG. 5. This allows the store operator to select another screen # as shown in FIG. 4a. If the store operator answers no 58, the flowchart flows to Node 55 in FIG. 5. This allows the store operator to select, add, or edit another item on the pizza screen.

The key advantages of the Web-based POS builder are that it is completely built on the foundation of the Web. The POS builder is accessible anywhere in the world. It can be used by a person of any skill level. The POS builder builds, edits, and tests new POS terminals in real time. In addition, all screen designs and changes are reflected real-time into the back office (BO) server's screen database. For example, all screen designs inputted from any PC in the world appear instantly in the BO screen database, which is instantly viewable anywhere in the world via web browsers. Another big advantage is that all screen design software is located and executed in the BO server. Since all screen designs and changes are immediately visible from any manager's PC at their home or at headquarters, there is always management oversight of these changes. Therefore, this screen builder allows for local in-store flexibility by the individual store operator or manager, but also provides for corporate visibility of screens instantly for control and standardization. Also, this screen builder does not require the need for any server to be located in the store. Another advantage of this system is the use of standard PC and web architecture which offers both full-scalability without degrading system performance. This results in improved performance and lower cost of implementing these business systems. There is a lower cost associated with projects developed with the technology of this invention due to the flexibility of easy design changes and well-understood software. There is less training required for programmers and system testers. Projects can draw on the huge talent pool in the open source development community. The invention allows configurable software modules for different types of businesses and sales promotions. The invention allows remote monitoring of screen designs from anywhere via the web. There is minimal time required for the implementation and installation of the POS builder system, since the POS builder setup is as basic as a home PC setup. Another advantage is that the POS builder system can be provided as a service or deployed within a corporation. For example, Software as a Service (SAAS) is a software distribution model in which applications are hosted by a vendor or service provider and made available to customers over a network, typically the Internet. Another advantage of this invention is that the POS builder system is maintained in customer centric databases, making it impossible for customers to see other's data. Each POS builder system client gets their own instance of a database. When they log into the BO they are attached to their own relational database associated and validated via their user login and password.

While this invention has been particularly shown and described with Reference to the preferred embodiments thereof, it will be understood by those Skilled in the art that various changes in form and details may be made without Departing from the spirit and scope of this invention.

What is claimed is:

1. A web-based point of sale (POS) builder system comprising:
    at least one server configured to:
        communicate with one or more POS terminals over a network comprising the Internet, wherein the one or more POS terminals are configured to display one or more POS screens;
        receive, over the network from a POS builder interface, information used for creating or modifying the one or more POS screens including creating or modifying one or more display interfaces for display on the one or more POS screens, the one or more display interfaces being associated with one or more items;
        receive, from at least one of the one or more POS terminals over the network, further information regarding one or more POS transactions corresponding to the one or more items;
        configure the one or more POS terminals with the information over the network to create or modify based on the further information regarding one or more POS transactions the one or more POS screens displayed on the one or more POS terminals; and
        wherein the further information regarding the one or more POS transactions, the information used for creating or modifying the one or more POS screens, or a combination thereof comprises one or more of employee clock information, customer add/update information, item add/update information, promotion information, loyalty point information, discount information, taxation information, item cost information, or inventory information;
        wherein said further information regarding the one or more POS transactions relate to one or more transactions by corresponding customers respectively associated with at least one of said one or more POS terminals.

2. The web-based point of sale (POS) builder system of claim 1, wherein the POS builder interface is configured to run on a computing device.

3. The web-based point of sale (POS) builder system of claim 1, wherein the one or more POS terminals comprise a plurality of POS terminals in a plurality of locations.

4. The web-based point of sale (POS) builder system of claim 1, wherein the one or more items comprise at least one of: one or more items for sale, one or more promotions, or one or more loyalty points programs.

5. The web-based point of sale (POS) builder system of claim 1, wherein the at least one server is further configured to receive from the one or more POS terminals one or more videos captured by one or more cameras, wherein the one or more videos are correlated with the one or more POS transactions.

6. The web-based point of sale (POS) builder system of claim 5, wherein the one or more videos and the one or more POS transactions are indexed using a same clock.

7. The web-based point of sale (POS) builder system of claim 1, wherein the information regarding one or more POS transactions comprises one or more of the employee clock information, the customer add/update information, the item add/update information, or the promotion information.

8. The web-based point of sale (POS) builder system of claim 1, wherein the information regarding one or more POS transactions are viewable via the POS builder interface.

9. The web-based point of sale (POS) builder system of claim 1, wherein the one or more display interfaces comprise one or more buttons or keys.

10. The web-based point of sale (POS) builder system of claim 1, wherein the received information comprises information indicative of at least one of a number, shape, or arrangement of the one or more display interfaces.

11. The web-based point of sale (POS) builder system of claim 1, wherein the POS builder interface is accessible via a web browser.

12. The web-based point of sale (POS) builder system of claim 1, wherein the one or more display interfaces are accessible on the POS builder interface.

13. The web-based point of sale (POS) builder system of claim 1, wherein the at least one server is further configured to:
receive, over the network from the POS builder interface, second information regarding a modification to at least one of the one or more POS screens; and
update the at least one of the one or more POS screens on the one or more POS terminals based on the second information.

14. The web-based point of sale (POS) builder system of claim 1, wherein the at least one server is further configured to store information regarding the one or more POS screens.

15. The web-based point of sale (POS) builder system of claim 1, wherein the at least one server is located remotely from the one or more POS terminals.

16. The web-based point of sale (POS) builder system of claim 1, wherein the at least one server is further configured to receive the information for creating or modifying the one or more POS screens and create or modify the one or more POS screens in real time while the one or more POS terminals are in use performing one or more POS transactions.

17. The web-based point of sale (POS) builder system of claim 1, wherein the one or more POS terminals use the one or more POS screens after completing a pending POS transaction.

18. The web-based point of sale (POS) builder system of claim 1, wherein the at least one server is further configured to maintain information regarding POS screens for separate sets of POS terminals separately.

19. The web-based point of sale (POS) builder system of claim 1, wherein instructions to the POS builder interface for programmatic creation and modification of the POS terminals are not formatted in programming code.

20. The web-based point of sale (POS) builder system of claim 1, wherein the at least one server is further configured to maintain information regarding the one or more POS screens.

21. The web-based point of sale (POS) builder system of claim 1, wherein the received information comprises one or more attributes of the one or more items.

22. The web-based point of sale (POS) builder system of claim 1, wherein the POS terminals are configured to perform transactions independently of a connection with the network.

23. The web-based point of sale (POS) builder system of claim 1, wherein the input interface element comprises a data interface for inputting at least some of said further information.

24. The web-based point of sale (POS) builder system of claim 1, wherein to configure the one or more POS terminals comprises dynamically configuring the one or more POS terminals specific for the corresponding customer based on the one or more transactions by the corresponding customer.

25. The web-based point of sale (POS) builder system of claim 1, wherein the POS builder interface is configured to create or modify at least one of: a position or operation of a first display interface of the one or more display interfaces, wherein the first display interface comprises an input interface element.

26. The web-based point of sale (POS) builder system of claim 25, wherein the input interface element comprises a touch screen input interface element.

27. A web-based point of sale (POS) builder system comprising:
at least one POS terminal configured to:
display one or more POS screens;
communicate with at least one server over a network comprising the Internet;
receive, over the network from the at least one server, information used for creating or modifying the one or more POS screens including creating or modifying one or more display interfaces for display on the one or more POS screens, the one or more display interfaces being associated with one or more items;
perform one or more transactions with respect to the one or more items; and
transmit, from at least one of the one or more POS terminals over the network, further information regarding one or more POS transactions corresponding to the one or more items; and
create or modify based on the received information or further information the one or more POS screens;
wherein the further information regarding the one or more POS transactions, the information used for creating or modifying the one or more POS screens, or a combination thereof comprises one or more of employee clock information, customer add/update information, item add/update information, promotion information, loyalty point information, discount information, taxation information, item cost information, or inventory information; and
wherein said one or more POS transactions relate to one or more transactions by corresponding customers respectively associated with at least one of said one or more POS terminals.

28. The web-based point of sale (POS) builder system of claim 27, wherein the at least one POS terminal comprises a plurality of POS terminals in a plurality of locations.

29. The web-based point of sale (POS) builder system of claim 27, wherein the at least one POS terminal is further configured to:
capture one or more videos using one or more cameras while performing the one or more transactions; and
correlate the one or more videos with the one or more transactions.

30. The web-based point of sale (POS) builder system of claim 29, wherein the one or more videos and the one or more POS transactions are indexed using a same clock.

31. The web-based point of sale (POS) builder system of claim 27, wherein the one or more display interfaces comprise one or more buttons or keys.

32. The web-based point of sale (POS) builder system of claim 27, wherein the received information comprises information indicative of at least one of a number, shape, or arrangement of the one or more display interfaces.

33. The web-based point of sale (POS) builder system of claim 27, wherein the at least one server is located remotely from the at least one POS terminal.

34. The web-based point of sale (POS) builder system of claim 27, wherein the at least one POS terminal is further configured to perform the one or more transactions in real time while the one or more POS screens are created or modified.

35. The web-based point of sale (POS) builder system of claim 34, wherein the at least one POS terminal uses the created or modified one or more POS screens after completing a pending POS transaction.

36. The web-based point of sale (POS) builder system of claim 27, wherein the received information comprises one or more attributes of the one or more items.

37. The web-based point of sale (POS) builder system of claim 27, wherein the one or more items comprise at least one of: one or more items for sale, one or more promotions, or one or more loyalty points programs.

38. The web-based point of sale (POS) builder system of claim 27, wherein the at least one POS terminal is further configured to perform the one or more transactions without a connection to the web server and transmit the information regarding the one or more transactions to the at least one web server after performing the one or more transactions and when the connection to the web server is established.

39. The web-based point of sale (POS) builder system of claim 38, wherein the at least one POS terminal is further configured to store locally the information regarding the one or more transactions.

40. The web-based point of sale (POS) builder system of claim 27, wherein a position or operation of a first display interface of the one or more display interfaces is created or modified, wherein the first display interface comprises an input interface element.

41. The web-based point of sale (POS) builder system of claim 40, wherein the input interface element comprises a touch screen input interface element.

42. A method of implementing a web-based point of sale (POS) builder system, the method comprising:
communicating with one or more POS terminals over a network comprising the Internet, wherein the one or more POS terminals are configured to display one or more POS screens;
receiving, over the network from a POS builder interface, information used for creating or modifying the one or more POS screens including creating or modifying one or more display interfaces for display on the one or more POS screens, the one or more display interfaces being associated with one or more items;
receiving, from at least one of the one or more POS terminals over the network, further information regarding one or more POS transactions corresponding to the one or more items; and
provisioning the one or more POS terminals with the information over the network to create, or modify based on the further information the one or more POS screens displayed on the one or more POS terminals;
wherein the further information regarding the one or more POS transactions, the information used for creating or modifying the one or more POS screens, or a combination thereof comprises one or more of employee clock information, customer add/update information, item add/update information, promotion information, loyalty point information, discount information, taxation information, item cost information, or inventory information; and
wherein said further information regarding the one or more POS transactions relate to one or more transactions by corresponding customers respectively associated with at least one of said one or more POS terminals.

43. A method of implementing a web-based point of sale (POS) builder system, the method comprising:
displaying one or more POS screens;
communicating with at least one server over a network comprising the Internet;
receiving, over the network from the at least one server, information used for creating or modifying the one or more POS screens including creating or modifying one or more display interfaces for display on the one or more POS screens, the one or more display interfaces being associated with one or more items;
performing one or more transactions with respect to the one or more items;
transmitting, to the at least one server, over the network, further information regarding one or more transactions corresponding to the one or more items; and
creating or modifying based on the received information the one or more POS screens;
wherein the further information regarding the one or more transactions, the information used for creating or modifying the one or more POS screens, or a combination thereof comprises one or more of employee clock information, customer add/update information, item add/update information, promotion information, loyalty point information, discount information, taxation information, item cost information, or inventory information; and
wherein said further information regarding the one or more POS transactions relate to one or more transactions by corresponding customers respectively associated with at least one of said one or more POS terminals.

44. A web-based point of sale (POS) builder system comprising:
at least one server configured to:
communicate with one or more POS terminals over a network comprising the Internet, wherein the one or more POS terminals are configured to display one or more POS screens;
receive, over the network from a POS builder interface, information for creating or modifying functionality of the one or more POS terminals;

receive, from at least one of the one or more POS terminals over the network, further information regarding one or more POS transactions corresponding to the one or more items; and configure the one or more POS terminals with the information over the network to create, or modify based on the further information the functionality of the one or more POS terminals;

wherein the further information regarding the one or more POS transactions, the information used for creating or modifying the one or more POS screens, or a combination thereof comprises one or more of employee clock information, customer add/update information, item add/update information, promotion information, loyalty point information, discount information, taxation information, item cost information, or inventory information; and wherein said further information regarding the one or more POS transactions relate to one or more transactions by corresponding customers respectively associated with at least one of said one or more POS terminals.

* * * * *